United States Patent
Wilke

[11] 3,800,188
[45] Mar. 26, 1974

[54] CONTROLLABLE ELECTRIC DISCONNECTION DEVICE FOR THE PROTECTION OF UNDER-AND OVER REVOLUTIONS OF A SHAFT

[76] Inventor: Richard Wilke, Am Weissenfeld 4, Schwelm, Germany

[22] Filed: Feb. 23, 1973

[21] Appl. No.: 335,330

[30] Foreign Application Priority Data
Feb. 25, 1972  Germany............................ 2209001

[52] U.S. Cl................. 317/9 R, 179/112, 310/168, 322/47, 322/69, 322/78
[51] Int. Cl. .................................................. H02h 7/06
[58] Field of Search............. 322/1, 3, 4, 10, 47, 69, 322/78; 310/168, 169, 170; 179/107 R, 112, 182 R; 317/19, 20, 9 R

[56] References Cited
UNITED STATES PATENTS

| | | | |
|---|---|---|---|
| 2,556,471 | 6/1951 | Elam............................... | 310/168 X |
| 2,805,677 | 9/1957 | Baird .............................. | 310/168 X |
| 3,085,170 | 4/1963 | Brown............................. | 310/168 X |
| 3,163,788 | 12/1964 | Powers............................ | 310/168 X |

*Primary Examiner*—James D. Trammell

[57] ABSTRACT

A controllable electric disconnection device for the protection from overpassing and underpassing the number of revolutions of a shaft, which comprises a generator disposed immovably in space and effective electromagnetically. An iron ring is rigidly disposed on the shaft, and corrugated on its periphery as well as rotating with the shaft. The generator produces impulses. An electric tension-resonance circuit amplifying the impulses. An amplifier follows the circuit. The impulses produced in the generator is emitted by means of a two-veined cable to the electric-resonance circuit and by means of the amplifier releasing certain electric switching proceedings, when the impulses due to overpassing and underpassing, respectively, of the number of revolutions of the shaft, overpass and underpass, respectively, the impulse-frequency. An electric switching-selector-repeater, which permits effectiveness only upon reaching the nominal number of revolutions of the shaft to be observed. The generator produces a sinus curve poor in its upper waves and comprises a double permanent magnet system independent from the direction of rotation with a telephone receiver coil disposed between the magnets and a soft iron sheet metal core arranged in the coil, which, angularly bent on both sides, engages sides of the magnets remote to a generator wheel. The parts are immovably embedded in synthetic material. The iron ring has outer pointed prongs and inner rounded waves such, that the distance between each pair of adjacent prongs is equal with the distance between the inner lower end of the rectangular magnets and the center of a medium soft iron pole shoe. The tension resonance circuit for amplification of the impulses have a controllable ohmic loss resistance, the useful tension of which switches through a following transistor by means of a rectifier and an RC smoothing member, the latter switching on a relay by means of a differential amplifier, the contacts of the relay causing the energy feed for the rotating shaft. A permanent "One-Contact" producing during the starting procedure of the rotating shaft by a series connection of two resistances and a condenser a substitute tension, switching through the transistor and becoming ineffective and producing again the substitute tension after opening and closing, upon response of the disconnection devise. A bi-metal-temperature keeper adapted to realize a temperature observation of the rotating shaft and its machine parts, and the bi-metal temperature-keeper is disposed in series with the frequency generator and the tension resonance circuit.

1 Claim, 5 Drawing Figures $R_1$ = 10kΩ  $R_4$ = 820Ω
$R_2$ = 3kΩ  $R_5$ = 6,8kΩ
$R_3$ = 1kΩ  $C_1$ = 10μF
         $C_2$ = 500μF $R_1 = 10 k\Omega \quad R_4 = 820\Omega$
$R_2 = 3 k\Omega \quad R_5 = 6{,}8 k\Omega$
$R_3 = 1 k\Omega \quad C_1 = 10 \mu F$
$\qquad\qquad\quad C_2 = 500 \mu F$

CONTROLLABLE ELECTRIC DISCONNECTION DEVICE FOR THE PROTECTION OF UNDER-AND OVER REVOLUTIONS OF A SHAFT

The present invention relates to a controllable electric disconnection device for the protection of under- and over-revolutions of a shaft, which consists of an electromagnetically effective, immovably disposed generator and an iron ring corrugated on the periphery and rigidly disposed on the shaft and rotating with the shaft, whereby the impulses produced in the generator are emitted by means of a two-veined cable to an elastic tension-resonance circuit and release certain electric switching processes by means of a following amplifier, if the impulses produced by the generator due to over- or under stepping of the revolutions of the shaft overstep or understep the impulse-frequencies, and which furthermore is equipped with an electric starting switching selector repeater, which only after reaching of the nominal number of revolutions of the shaft to be observed, the impulses of the generator are permitted to become effective.

In addition to the above described disconnection device, it is also known, in the simplest embodiment to use electro-mechanical centrifugal switches, which respond in case of understepping or overstepping certain numbers of revolutions and release desired proceedings. Known are also devices, which produce impulses by means of magnetic or photoelectric fields, which are proportional to the number of revolutions and release likewise desired proceedings, if the number of revolutions are understepped or overstepped, i.e. the number of impulses per time unit becomes too low or too high.

Starting especially from the first mentioned embodiment of a disconnection device it is the object of the present invention to provide a release device with a simple frequency generator of a high efficiency and median frequency, which release device is controllable in its response sensitivity and effective electrically over-proportionally, and which is in addition equally sensitive in both directions of rotation, whereby the disconnection during the rotation of the shaft can be controlled automatically in accordance with a desired program.

It is another object of the present invention to provide a frequency generator designed immovably in space, which produces by a symmetrical structure of two permanent magnets with a telephone receiver coil disposed therebetween independent from the direction of rotation a sinus curve poor in its upper waves, which changes linearly its frequency with the number of revolutions, whereby an iron ring corrugated along the periphery as generator wheel is equipped with outer pointed prongs and inner rounded waves, and the distance of the prongs for the bridging of the magnet flux corresponds with the distance between both magnets and the median pole of the telephone receiver coil. For the realization of the controllable over-proportional sensitivity of the release device the sinus frequency of the frequency generator is emitted to an electric resonance circuit, which is tuned to the generator frequency at normal number of revolutions and the sensitivity of which is variable by control of a loss resistance and with following amplifier and release relais is constructed in a particular housing.

Since each shaft must start, prior to observing its number of revolutions, the electric release device must be ineffective during the starting period, since the number of revolutions to be observed is present only after the starting procedure.

It is a further aim of the present invention, to make possible this starting bridging also with permanent contact arrangement for the switching on. Normally in the case of a simple operation by example an electric motor is switched on by a push button with a short-timed contact by means of a relay with a self holding contact. In control devices with sequence controls, it is yet conventional to operate with permanent contacts, in order to observe the state of the arrangement. This permanent contact arrangement is possible by a connection of resistances with a condenser, which, upon occurrence of the release procedure by lowering the number of revolutions, make possible a reswitching-on only after release of the permanent contact arrangement and reswitching-on of the permanent contact.

In accordance with a further development of the present invention, the releasing device can be applied in simplest manner for the temperature observation of the mounting of the rotating shaft and of the driving machine, by switching bi-metal temperature-keepers in series with the frequency generator. These bi-metal temperature keepers open their contact upon overpassing of a permissible temperature and interrup thereby the connection between frequency generator and resonance-circuit.

With these and other objects in view which will become apparent in the following detailed description, the present invention, which is shown by example only, will be clearly understood in connection with the accompanying drawings, in which.

Figure 1:
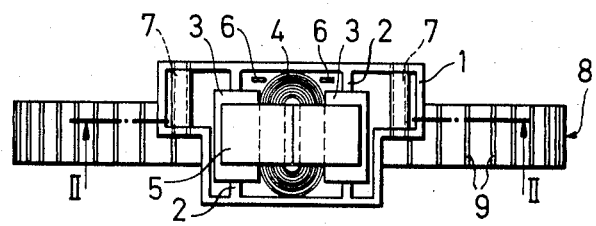
FIG. 1 is a top plan view of the frequency generator with a pole wheel disposed therebelow, in natural size.
Figure 2:
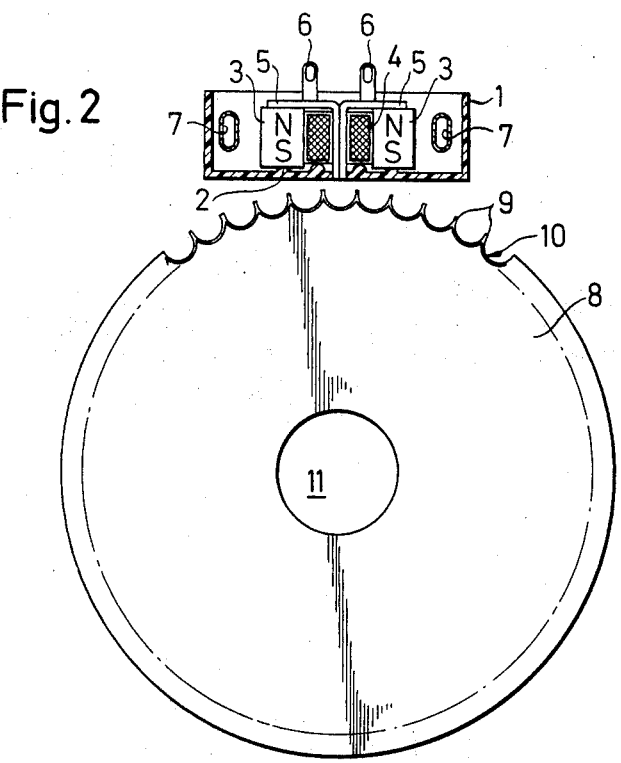
FIG. 2 is a longitudinal section of the arrangement of FIG. 1, likewise in natural size.

Referring now to the drawings, the simultaneous observation of FIGS. 1 and 2 shows at first a housing 1 of synthetic material, which is equipped with ribs 2, which serve the purpose to fix the parts to be inserted in this housing 1 in their position.

The parts to be inserted consist of a telephone receiver coil 4 with a fine wire winding of 2000 ohm, furthermore of two permanent magnets 3, which are designed rectangular and further of two equal-armed soft iron sheet metal angles 5, which are put through the center recess of the telephone receiver coil. These parts adhere by the magnet forces as a compact unit together and can be inserted after their simple joining into the housing 1 of synthetic material. The housing 1 of synthetic material has furthermore laterally two oval longitudinal bores 7, which are closed by means of a metal sleeve. After insertion of these previously described parts, the housing 1 of synthetic material has poured onto the latter self-hardening synthetic resin and simultaneously the connection of the telephone receiver coil is soldered onto soldering eyes 6 and project out from the poured housing as terminal clamps. This simple manner of structure results in a frequency generator, which is completely water-tight and is protected in wide limits constant as to temperature in relation to other influences.

As shown in FIG. 2, this frequency generator housing 1 is provided by means of the oval longitudinal holes 7 such above a generator wheel 8, that between the two pole shoes of soft iron sheet metal, which practically close the housing bottom and the generator wheel 8, a distance of about 0.4mm – 0.5 mm exists. The generator wheel 8 itself consists of a glass fiber enforced polyester in the outer periphery of which a wavy soft iron sheet metal ring 10 of a wall thickness of 0.5 mm is pressed in. The production of this soft iron ring 10 of 0.5 mm sheet metal thickness and in the practice of 10 mm width takes place on a simple pressing device in a continuous manner, so that the rings necessary for a peripheral layer are cut off and can be inserted into the form, before the enforced glass fiber ring of synthetic material is brought in and is formed. The generator wheel 8 itself carries in the center the bore 11 provided on the shaft for the securing. The generator wheel 8 can be glued onto the shaft since it does not have to transfer any forces.

The individual ribs 9 of the wavy sheet metal ring have a distance, which, as shown in FIG. 2, suffices just for the overbridging of the magnet flux between the magnet pole and the soft iron pole in the center of the telephone receiver coil.

As can be easily understood, after a rotation for the half distance of the ribs 9, this magnet flux between the two magnets and the median pole is very effectively interrupted. If the generator wheel 8 is put to rotation, thus a very strong variation of the magnetic flux results by the variable passing by of once closed connections 9—9 to the poles and to the median soft iron pole and furthermore an effective opening results.

The result is a quite clean sinus curve, which in the shown example at a number of revolutions of the shaft of 1500 RpM produces an idle tension of 8V at the two connection clamps 6. Since the number of teeth 9 amounts to 76 in the shown example, a frequency of 1900 Hz results.

The arrangement of two permanent magnets on both sides of the telephone receiver coil 4 is necessary, in order to release in both possible directions of rotation of the shaft the same signal in the same strength of 8 V and 1900 Hz.

The distance shown in FIG. 2 between the generator wheel 8 and the magnet pole of the housing 1 should amount to about 0.4 mm – 0.5 mm. If this value is lower, then the effective weakening and amplification of the magnet yield is no more so clean, that one obtains the desired sinus shape without upper waves. If the distance is increased, then the inducted tension of 8 V is lower and the necessary response sensitivity upon variation of the number of revolutions, as it is described later, is likewise weakened. It is to mention thereby that the maintenance of the desired distance is not very critical, on the other hand, however, in the normal production tolerances can be maintained without particular difficulties, which means a particular advantage for the practical use of this arrangement.

In the cases in which the generator wheel 8, which has in FIG. 2 a diameter of 100 mm, is too large, also a smaller generator wheel of 45 mm diameter with only 32 teeth can be used, which then produces at 1500 revolutions per minute a frequency of 800 Hz.

Figure 3:
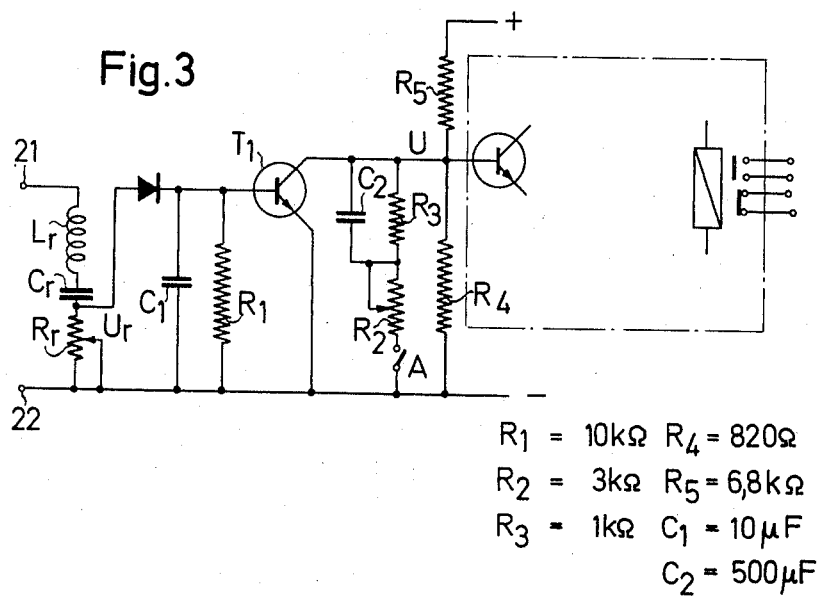
FIG. 3 is a showing of the resonance circuit with complementary amplifier and release relays in a particular housing.

The frequency to be taken at the soldered eyes 6 can be transformed by means of a normal cable over a larger length of 100 meters and more; this means that the receiver shown in FIG. 3 can be built together in a housing, and can be provided in a service cabinet, which contains also the remaining parts for the control of the machine to be observed.

As indicated in FIG. 3, the arriving two veins, which are connected with the soldered eye 6, are put onto the input clamps 21 and 22. Between 21 and 22 is disposed a self induction coil $L_r$ in series with a capacity $C_r$ and a control resistance $R_r$. These three parts form together with the telephone receiver coil 4 a tension resonance circuit, which is dimensioned such, that it is set for the normal frequency at a normal number of revolutions, as it is explained by means of FIG. 4.

Figure 4:
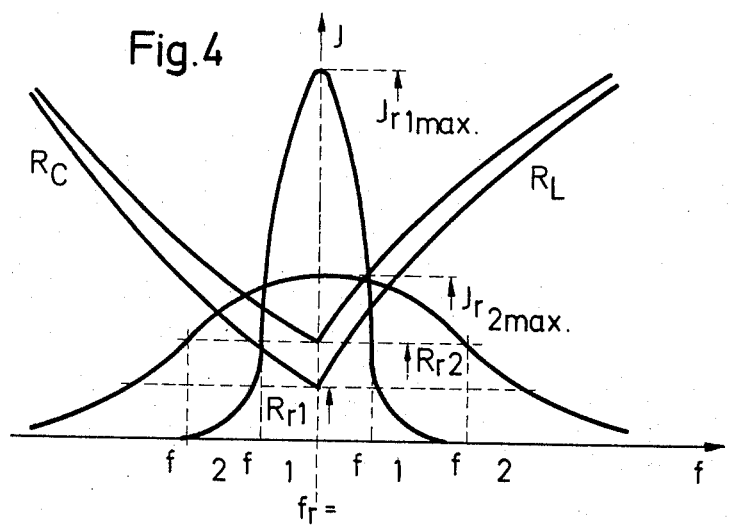
FIG. 4 is a diagrammatical showing depicting the overproportional effect by the resonance circuit.

In FIG. 4 is shown, how in case of two differently adjusted resistance values of the control resistance $R_r$ the height of the resonance curve varies and how simultaneously also the useful tension $U_r$ to be taken from the resistance $R_r$, which useful tension $U_r$ results from the product of resonance current strength $I_r$ and set resistance $R_r$, varies. Likewise it becomes clear, how the switching off points may be displaced to a lower or higher number of revolutions or frequencies, respectively, by enlargement by the half value width due to increase of the resistance $R_r$.

In the lowest possible resistance $R_{r1}$ assumed in FIG. 4 result at at least required tension $U_r$ of by example 0.7 V, which leads to a switching off at the points $f_{ab1}$, if the number of revolutions and thereby the frequency is lowered or increased.

If the half value width is increased by increase of the resistance of 2 $R_{r2}$ then the product results from the resonance current strength $I_{r2}$ with the resistance $R_{r2}$ likewise again the value $U_r$ which means that the switching off point $f_{ab2}$ lies at underpassing or overpassing of a lower or higher number of revolutions, respectively.

As can be ascertained from FIG. 3, the signal tension $U_r$ is given by means of a rectifier to a resistance $R_1$ with parallel condenser $C_1$ which results into a smooth and direct voltage, which switches through the following transistor $T_1$. To the transistor $T_1$ is connected a differential amplifier, which at the moment, in which transistor $T_1$ is switched through, switches on a relay whereby a permanent contact results, which feeds the machine, the number of revolutions of which is observed, with the necessary energy.

If the number of revolutions of the machine to be observed falls, then the tension $U_r$, as indicated in FIG. 4, moves below the minimum value and the transistor $T_1$ is locked and causes in this state by means of the differential amplifier, that the relay falls of and the machine is switched off from the energy source. The same occurs when the number of revolutions of the machine to be observed moves too high.

In order to make possible the starting procedure of the shaft to be observed as to its number of revolutions, it is necessary, during the starting procedure instead of providing the tension $U_r$ not yet present at the control resistance $R_r$, to permit effectiveness of a substitute tension, which disappears after the performed high run.

In accordance with the present invention, this starting bridging is realized by a series connection of a controllable resistance $R_3$ with a resistance $R_2$ with parallel condenser $C_2$. If the switch A, which is supposed to bring to start the shaft, is operated and provides a duration contact, then the condenser $C_2$ is charged by means of the resistance $R_3$. This charging current shock brings about, that the tension collapses at the point U which had a positive potential of about 1.5 V prior to the operation of the switch, so that $Y_1$ is locked and thereby the following differential amplifier is switched on. At the same moment the relay disposed in the differential amplifier pulls the relay and switches on the machine, which now runs high. As can be recognized from FIG. 5, at the moment of the switching on of A the condenser $C_2$ is charged in accordance with the loading curve, which is identified by $C_2$. If the loading stage is reached, at the same time the machine to be observed is brought to the nominal number of revolutions and the combination of the condenser $C_2$ with the parallel resistance $R_2$ now becomes ineffective relative to the working resistance $R_4$ of 820 ohm. The switch through resistance $T_1$ takes care that the tension remains at the point U now approximately negative and the differential amplifier holds the relay switched on. The number of revolutions is now observed, as described before. If the tension $U_r$ is lowered by the fact that the number of revolutions lowers or increases, then the transistor $T_1$ is locked, and the charge is switched off. The condenser $C_2$ with resistance $R_2$ does not become effective in this state, since it cannot vary the tension state between the two resistances $R_5$ and $R_4$. Only when the switch A is opened and closed again, the procedure starts anew, as FIG. 5 shows.

Figure 5:
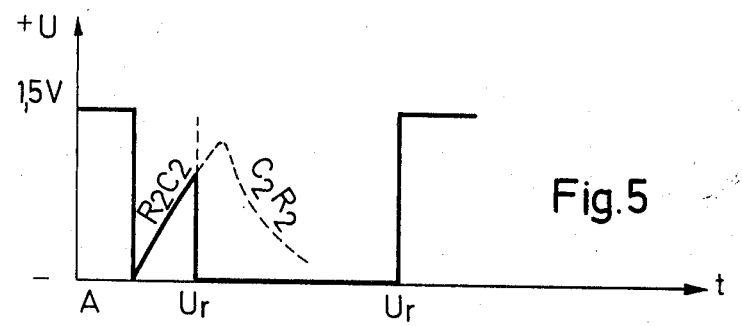
FIG. 5 is a diagram depicting the effect of the starting time bridging.

It should be still mentioned that in the simplest case in which by example only one motor is switched on, no following up control with permanent contact A is required, that the contact at A can be obtained also by a push button which has to be pressed, as can be ascertained from FIG. 5 a short time only.

While I have disclosed one embodiment of the present invention it is to be understood that this embodiment is given by example only and not in a limiting sense.

I claim:

1. A controllable electric disconnecton device for the protection from overpassing and underpassing the number of revolutions of a shaft, comprising
a generator disposed immovable in space and effective electromagnetically, and
an iron ring rigidly disposed on said shaft, and corrugated on its periphery as well as rotating with said shaft,
said generator producing impulses,
an electric tension-resonance circuit amplifying said impulses,
an amplifier following said circuit,
said impulses produced in said generator being emitted by means of a two-veined cable to said electric-resonance circuit and by means of said amplifier releasing certain electric switching proceedings, when said impulses due to overpassing and underpassing, respectively, of the number of revolutions of said shaft, overpassing and underpassing, respectively the impulse-frequency,
an electric switching-selector-repeater, permitting effectiveness only upon reaching the nominal number of revolutions of said shaft to be observed,
said generator producing a sinus curve poor in its upper waves and comprising a double permanent magnet system independent from the direction of rotation with a telephone receiver coil disposed between said magnets and a soft iron sheet metal core arranged in said coil, which, angularly bent on both sides, engaging sides of said magnets remote to a generator wheel,
said parts being immovably embedded in synthetic material,
said iron ring having outer pointed prongs and inner rounded waves such, that the distance between each pair of adjacent prongs being equal with the distance between the inner lower end of said rectangular magnets and the center of a medium soft iron pole shoe,
said tension resonance circuit for amplification of said impulses having a controllable ohmic loss resistance, the useful tension of which switching through a following transistor by means of a rectifier and an RC smoothing member, the latter switching on a relay by means of a differential amplifier, the contacts of said relay causing the energy feed for said rotating shaft,
a permanent "One-Contact" producing during the starting procedure of said rotating shaft by a series connection of two resistances and a condenser a substitute tension, switching through said transistor and becoming ineffective and producing again the substitute tension after opening and closing, upon response of said disconnection device, and
a bi-metal-temperature keeper adapted to realize a temperature observation of said rotating shaft and its machine parts, and
said bi-metal temperature-keeper being disposed in series with said frequency generator and said tension resonance circuit.

* * * * *